(12) United States Patent
Girard et al.

(10) Patent No.: US 8,961,352 B2
(45) Date of Patent: Feb. 24, 2015

(54) DRIVE TRAIN PROVIDED WITH A CVT

(75) Inventors: Daniel Girard, Beloeil (CA);
Jean-François Dionne, St-Hubert (CA);
Jean-Robert Desmeules, Trois-Rivières (CA)

(73) Assignee: Transmission CVTCORP Inc., Ste-Julie, Quebec (CA)

( * ) Notice: Subject to any disclaimer, the term of this patent is extended or adjusted under 35 U.S.C. 154(b) by 171 days.

(21) Appl. No.: 13/635,698

(22) PCT Filed: Mar. 17, 2011

(86) PCT No.: PCT/CA2011/000295
§ 371 (c)(1),
(2), (4) Date: Sep. 25, 2012

(87) PCT Pub. No.: WO2011/113153
PCT Pub. Date: Sep. 22, 2011

(65) Prior Publication Data
US 2013/0210574 A1      Aug. 15, 2013

Related U.S. Application Data

(60) Provisional application No. 61/315,617, filed on Mar. 19, 2010.

(51) Int. Cl.
*F16H 37/02* (2006.01)
(52) U.S. Cl.
USPC ........................................................ 475/216

(58) Field of Classification Search
USPC ......................................................... 475/216
See application file for complete search history.

(56) References Cited

U.S. PATENT DOCUMENTS

| 4,662,240 | A | * | 5/1987 | Greenwood | 475/216 |
|---|---|---|---|---|---|
| 4,676,115 | A | | 6/1987 | Morscheck et al. | |
| 5,720,687 | A | * | 2/1998 | Bennett | 475/214 |
| 6,306,059 | B1 | * | 10/2001 | Yamada | 475/214 |
| 2003/0083170 | A1 | | 5/2003 | Ooyama | |
| 2003/0220167 | A1 | * | 11/2003 | Inoue | 475/216 |

FOREIGN PATENT DOCUMENTS

| JP | 2004211852 A | 7/2004 |
|---|---|---|
| JP | 2006300268 A | 11/2006 |
| WO | WO 2009030948 | * 3/2009 |

OTHER PUBLICATIONS

International Search Report and Written Opinion dated Jul. 4, 2011, issued in connection with related PCT/CA2011/000295 filed Mar. 17, 2011, Girard et al.
Supplemental European Search Report dated Dec. 16, 2013, issued in connection with related EP 11 75 5600.

* cited by examiner

*Primary Examiner* — Sherry Estremsky
(74) *Attorney, Agent, or Firm* — Downs Rachlin Martin PLLC

(57) ABSTRACT

A drive train provided with a CVT that can be used in both CVT and Infinitely Variable Transmission (IVT) configurations and that include a High-Low gear selection assembly is described herein. Transitions between configurations are seamless to the operator.

14 Claims, 18 Drawing Sheets

DRIVE TRAIN PROVIDED WITH A CVT

FIELD

The present disclosure generally relates to vehicle drive trains. More specifically, the present disclosure is concerned with a drive train provided with a Continuously Variable Transmission (CVT).

BACKGROUND

CVTs are well known in the art. Toroidal CVTs are also well known and are used when transmission ratios have to be finely adjusted.

However, the ratio range required on a vehicle is often such that the size required for a CVT to cover the entire ratio range would be so large that it would be impractical to position it in a vehicle.

DETAILED DESCRIPTION

An object is generally to provide an improved drive train including a CVT.

In accordance with an illustrative embodiment, there is provided a drive train including:

a prime mover having an output shaft;

a CVT including an input flange associated to the output shaft of the prime mover and an output flange;

a power mixing assembly having a first input connected to the output shaft of the prime mover; a second input connected to the output flange of the CVT and an output; and a high-low gear selection assembly having an input and an output defining the output of the drive train; the input of the high-low gear selection assembly being connectable to either the output flange of the CVT or to the output of the power mixing assembly.

In accordance with another aspect, there is provided a drive train for a vehicle including a prime mover provided with an output shaft; the drive train comprising:

a CVT including an input flange connected to the output shaft of the prime mover and an output flange;

a power mixing assembly having a first input connected to the output shaft of the prime mover; a second input connected to the output flange of the CVT and an output; and a high-low gear selection assembly having an input and an output defining the output of the drive train; the input of the high-low gear selection assembly being connectable to either the output flange of the CVT or the output of the power mixing assembly.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

Other objects, advantages and features will become more apparent upon reading of the following non-restrictive description of illustrative embodiments thereof, given by way of example only with reference to the accompanying drawings.

Generally stated, the present disclosure is concerned with a drive train provided with a CVT that can be used in both CVT and Infinitely Variable Transmission (IVT) configurations and that include low and high gear configurations. Transitions between configurations are seamless to the operator.

Figure 1:
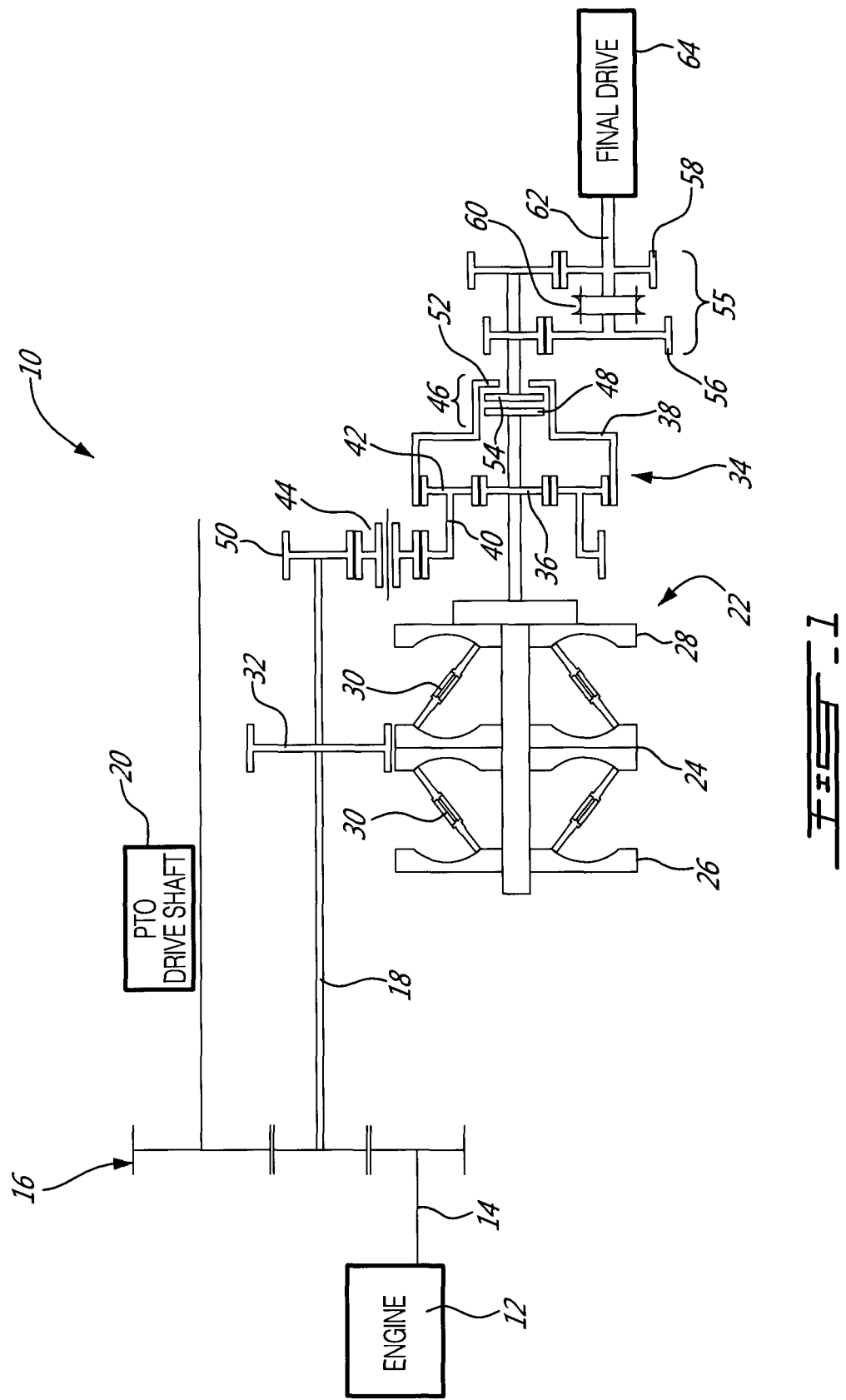
FIG. 1 is a schematic bloc diagram of a drive train including a CVT according to a first illustrative embodiment.

Turning now to FIG. 1 of the appended drawings, a drive train 10 according to a first illustrative embodiment will be described.

The drive train 10 includes a prime mover in the form of an engine 12 provided with an output shaft 14, a gear set 16 interconnecting the output shaft 14 to a main shaft 18 and, optionally, to a PTO shaft 20.

The drive train 10 also includes a dual-cavity toroidal CVT 22 provided with an input flange 24; two interconnected output flanges 26 and 28 and six rollers 30 (only four shown) provided between the input flange 24 and the output flanges 26 and 28.

It is to be noted that since the operation of a toroidal CVT is believed known to one skilled in the art, it will not be explained herein, for concision purpose.

The input flange 24 is connected to the main shaft 18 via a gear 32.

A power mixing mechanism 34 is also part of the drive train 10. The power mixing mechanism 34 includes a planetary gear train including a sun gear 36, a ring gear 38, a planet carrier 40 and planet gears 42; a direction reversing gear set 44 and a high-low gear set selection assembly in the form of a clutch 46.

The sun gear 36 is connected to the output flanges 26, 28 of the CVT 22 and is connected to a first fixed disk 48 of the clutch 46.

The planet carrier 40 is connected to the main shaft 18 via a gear 50 and the direction reversing gear set 44.

The ring gear 38 is connected to a second fixed disk 52 of the clutch 46.

A movable disk 54 of the clutch 46 is connected to the input of a High-Low gear selection assembly 55 and may be connected either to the first fixed disk 48, and thus to the sun gear 36, or to the second fixed disk 52 and thus to the ring gear 38.

It is to be understood that the fixed and moveable disks schematically represent the many disks that insure clutching in conventional electro-hydraulically actuated wet clutches. Of course, other types of clutches can be used.

The High-Low gear selection assembly 55 includes a low gear set 56 (shown herein as a speed reducing gear set); a high gear set 58 (shown herein as a one to one ratio gear set) and an engagement mechanism (for example a dual acting clutch pack or a synchronizer) 60 designed to selectively interconnect the output shaft 62 to the movable disk 54 of the clutch 46 via either to the low gear set or the high gear set.

It is to be noted that either the ratios of the low and high gear sets are selected in accordance with the intended use of the transmission 10. One skilled in the art will understand that the ratio of the low gear set ratio is greater than the ratio of the high gear set ratio.

It is also to be noted that since dual acting clutch packs and synchronizers are believed well known to those skilled in the art, their operation will not be discussed further herein.

The output shaft 62 is typically connected to the differential 64 of a vehicle.

It will be appreciated by one skilled in the art that the drive train 10 is only shown schematically in FIG. 1. Indeed, many required elements such as bearings, actuators and controller are not shown herein for clarity purpose.

Turning now to FIGS. 2 to 9 of the appended drawings, the operation of the drive train 10 will be described.

Figure 2:
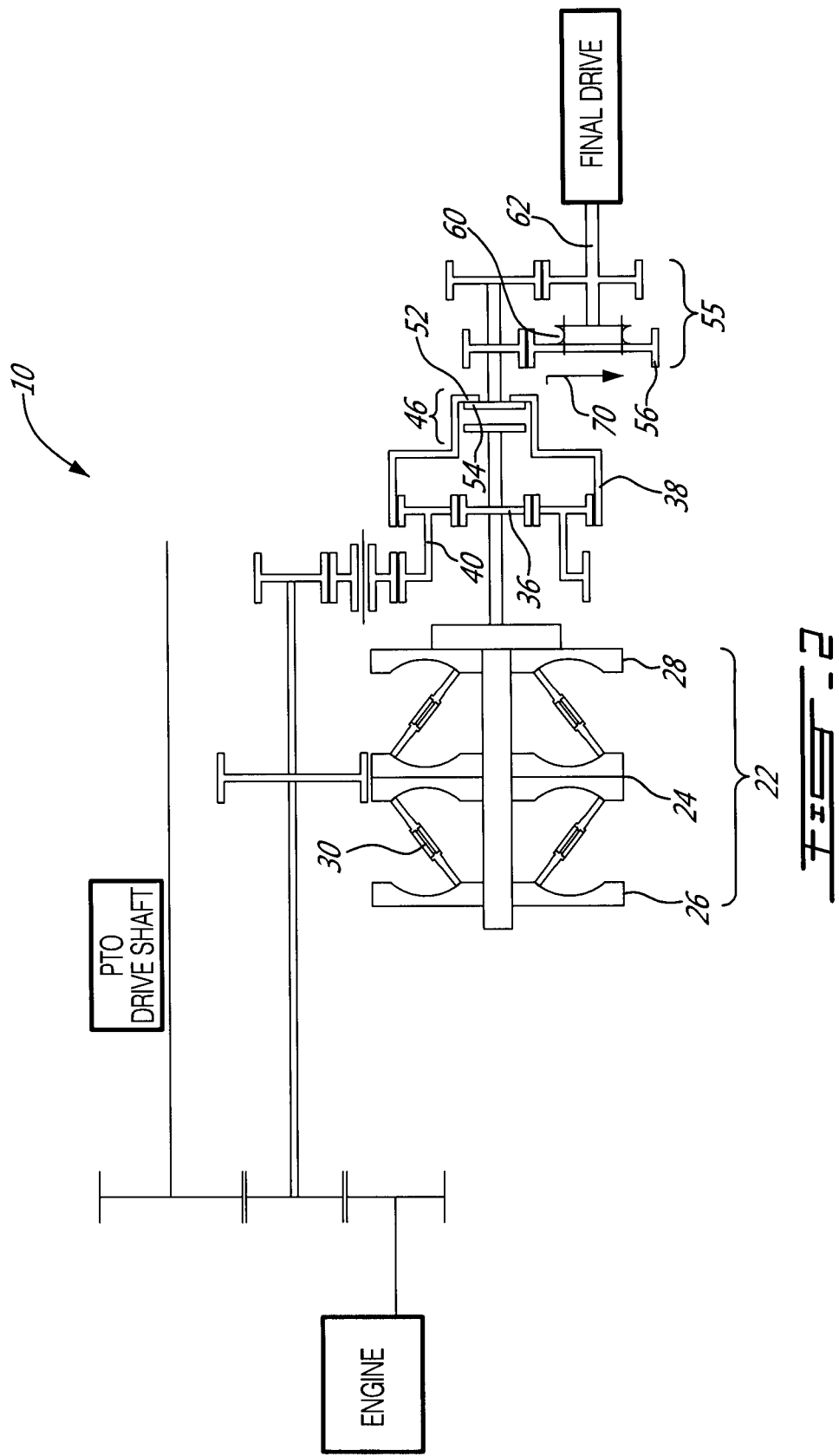
FIG. 2 is a schematic bloc diagram of the drive train of FIG. 1 shown in an IVT low configuration.

FIG. 2 is a schematic bloc diagram of the drive train 10 shown in an IVT low configuration. Accordingly, the movable disk 54 of the clutch 46 is connected with the fixed disk 52 and thus to the ring gear 38. Also, the engagement device 60 is such that the low gear set 56 is used to transfer torque to the output shaft 62 (see arrow 70).

The ratios of the various gears of the drive train 10 are so selected that when the drive train 10 is in the IVT low configuration shown in FIG. 2, and when the rollers 30 of the CVT 22 are in the overdrive position, the speed of the sun gear 36 and the speed of the planet carrier 40 are cancelling each other thus resulting in a zero speed of the ring gear 38. Accordingly, the speed of the output shaft 62 is also zero.

One skilled in the art will understand that by appropriately selecting the various gear ratios of the drive train 10, configuration of FIG. 2 could result in a reverse direction rotation of the output shaft 62, or in a low forward speed of the output shaft 62.

Figure 3:
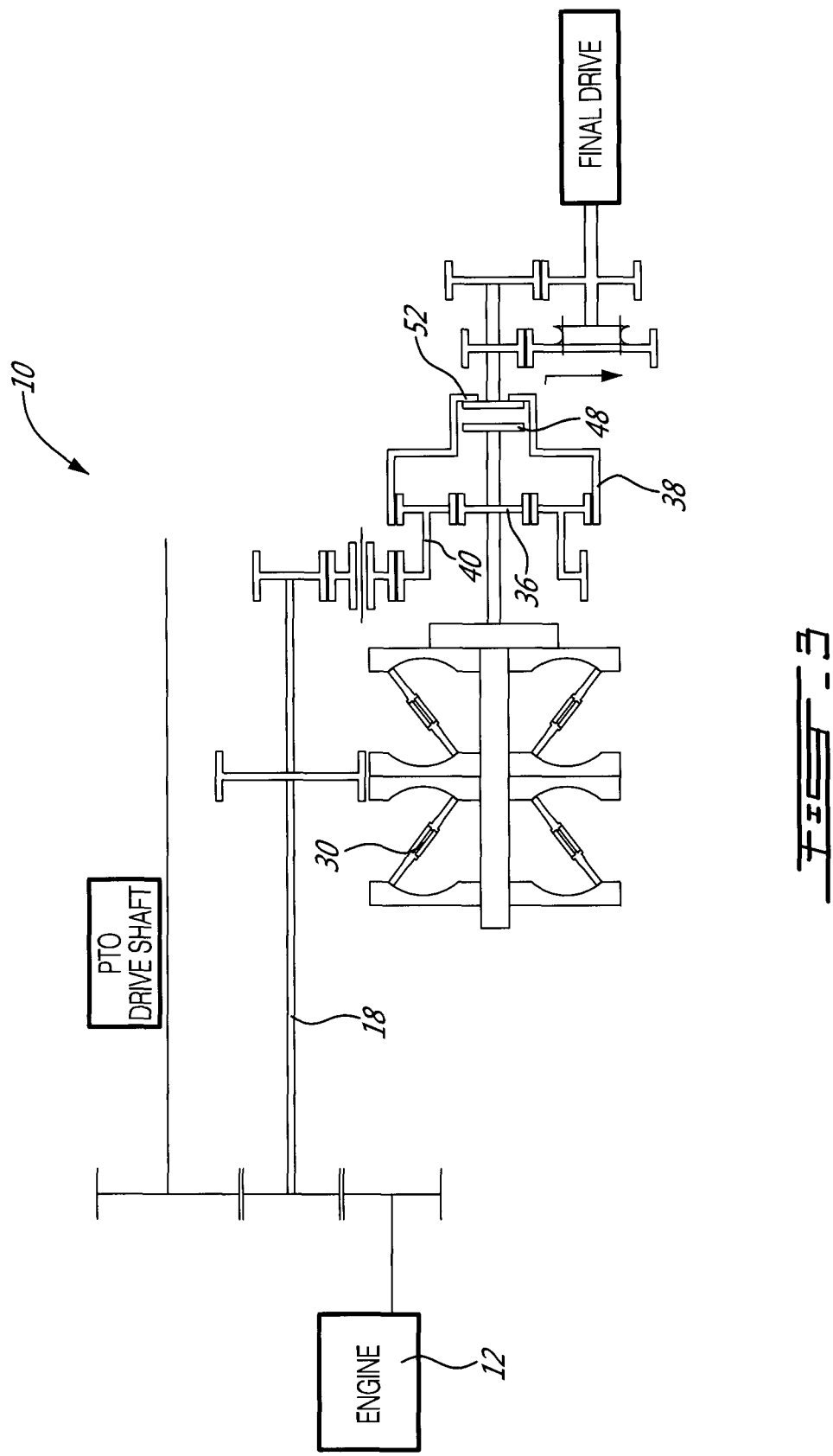
FIG. 3 is a schematic bloc diagram of the drive train of FIG. 1 shown at the maximal speed of the IVT low configuration.

Turning to FIG. 3, when the rollers 30 are moved from the overdrive position shown in FIG. 2 to the underdrive position shown in FIG. 3, the speed of the sun gear 36 decreases while the speed of the planet carrier 40 stays the same since the main shaft 18 speed is kept constant by the engine 12. Accordingly, the speed of the ring gear 38 increases to the IVT low maximal speed when the rollers 30 reach the underdrive position illustrated in FIG. 3.

It is to be noted that when the drive train 10 is in the configuration shown in FIG. 3, the speed of the ring gear 38 and the speed of the sun gear 36 are very similar, thanks to the various predetermined ratios of gears of the drive train 10. Since these speeds are very similar, it is possible to switch the movable disk 54 of the clutch 46 from its connection with the second fixed disk 52 to a connection with the first fixed disk 48 without any noticeable surge to the operator.

Figure 4:
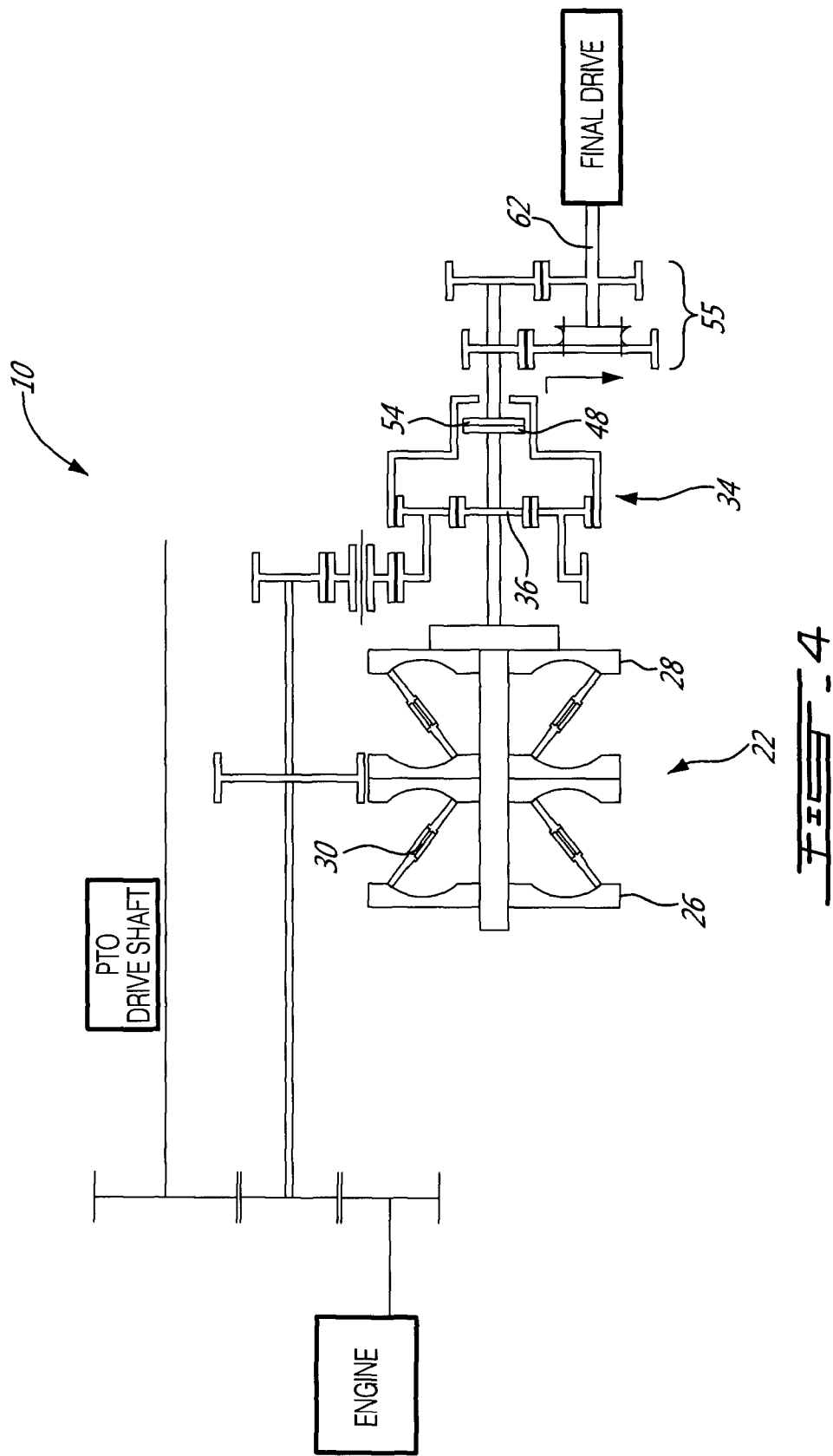
FIG. 4 is a schematic bloc diagram of the drive train of FIG. 1 shown in a CVT low configuration.

Turning now to FIG. 4, which is a schematic bloc diagram of the drive train 10 shown in a CVT low configuration. To achieve this configuration, the movable disk 54 is connected to the first fixed disk 48, thereby connecting the output flanges 26 and 28 directly to the input of the High-Low gear selection assembly 55. One skilled in the art will understand that the power mixing assembly 34 is not in function and that the entire torque supplied to the output shaft 62 goes through the CVT 22.

Figure 5:
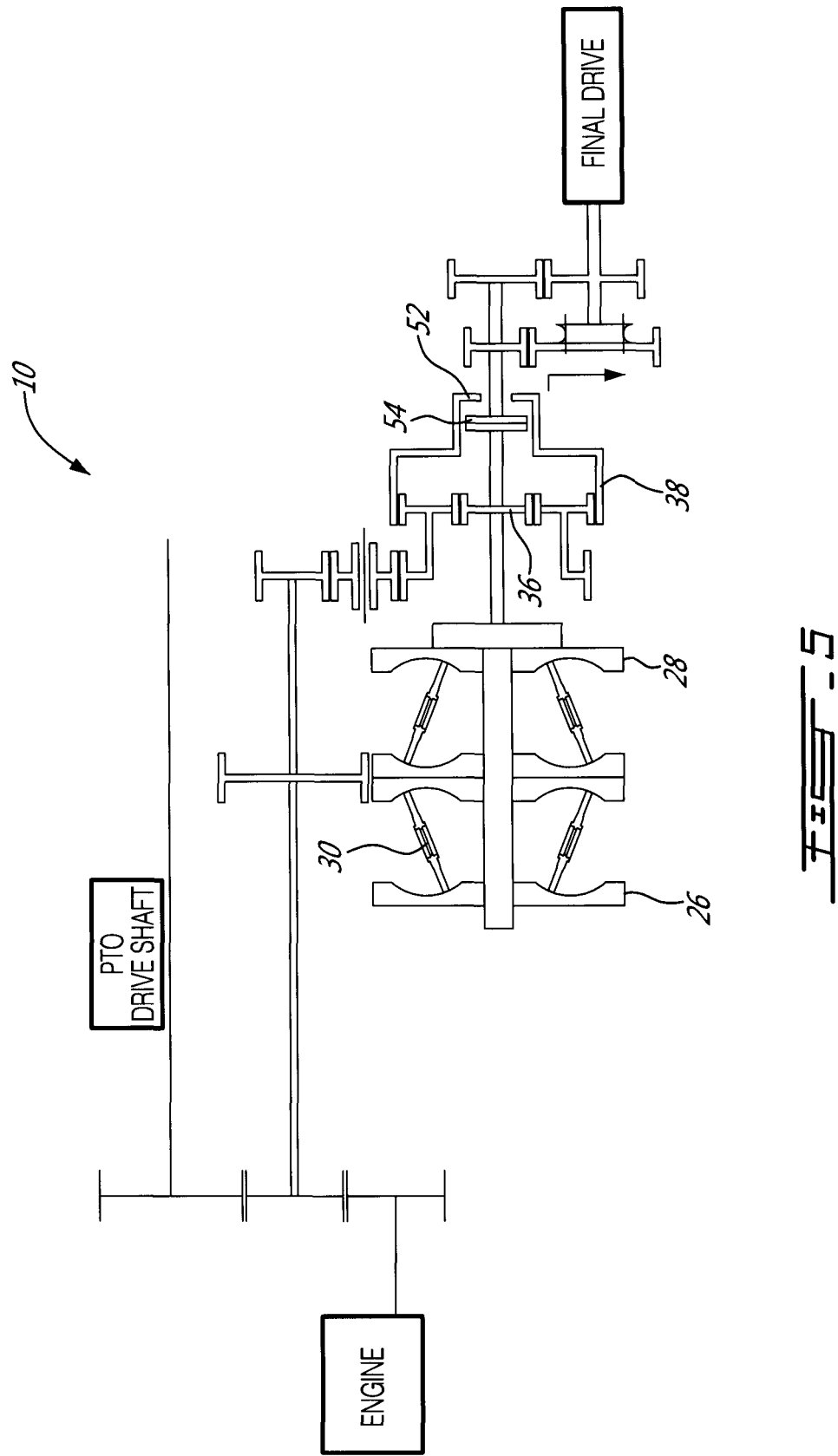
FIG. 5 is a schematic bloc diagram of the drive train of FIG. 1 shown at the maximal speed of the CVT low configuration.

When an increase of the speed of the output shaft 62 is desired, the rollers 30 of the CVT 22 move from the underdrive configuration of FIG. 4 to the overdrive configuration of FIG. 5.

FIG. 5 is a schematic bloc diagram of the drive train 10 shown at the maximal speed of the CVT low configuration. It is to be noted that the rollers 30 position of FIG. 5 is not such that the maximal speed at which the CVT 22 could drive its output flanges 26 and 28 is achieved. Indeed, the rollers 30 could be moved to a greater overdrive position. However, the rollers position schematically shown in FIG. 5 is such that the speed of the sun gear 36 and of the ring gear 38 are once again very similar allowing the movable disk 54 to be moved so that it contacts the second fixed disk 52 without any noticeable surge to the operator.

One skilled in the art will understand that while the speed of the engine 12 stays constant, the speed of the ring gear 38 decreases while the speed of the sun gear 36 increases when the ring gear 38 is not connected to the movable disk 54 of the clutch 46.

Figure 6:
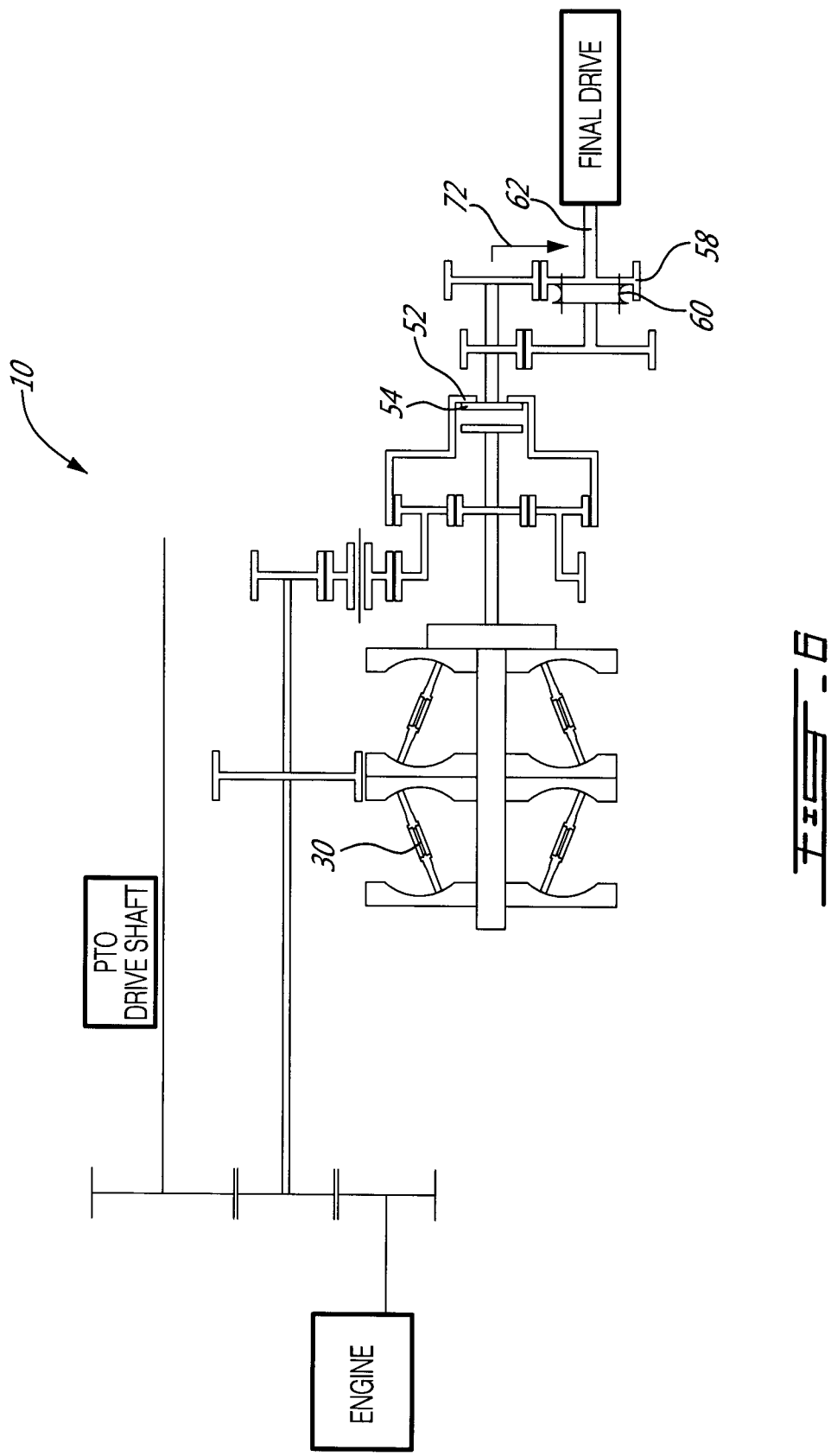
FIG. 6 is a schematic bloc diagram of the drive train of FIG. 1 shown in an IVT high configuration.

To change from the CVT low configuration shown in FIG. 5 to the IVT high configuration shown in FIG. 6, two things need to happen almost simultaneously. First, the movable disk 54 needs to be connected to the fixed disk 52 and second, the engagement device 60 needs to connect the output shaft 62 to the high gear set 58. When this is done nearly simultaneously, and counting on the slippage of the clutch 46 and of the engagement device 60, no noticeable surge is felt by the operator.

FIG. 6 is a schematic bloc diagram of the drive train 10 in the IVT high configuration. The power supplied to the output shaft 62 transits through the high gear set 58 (see arrow 72). When the drive train is in this configuration, the rollers 30 can be moved towards their underdrive configuration to increase the speed of the output shaft 62.

Figure 7:
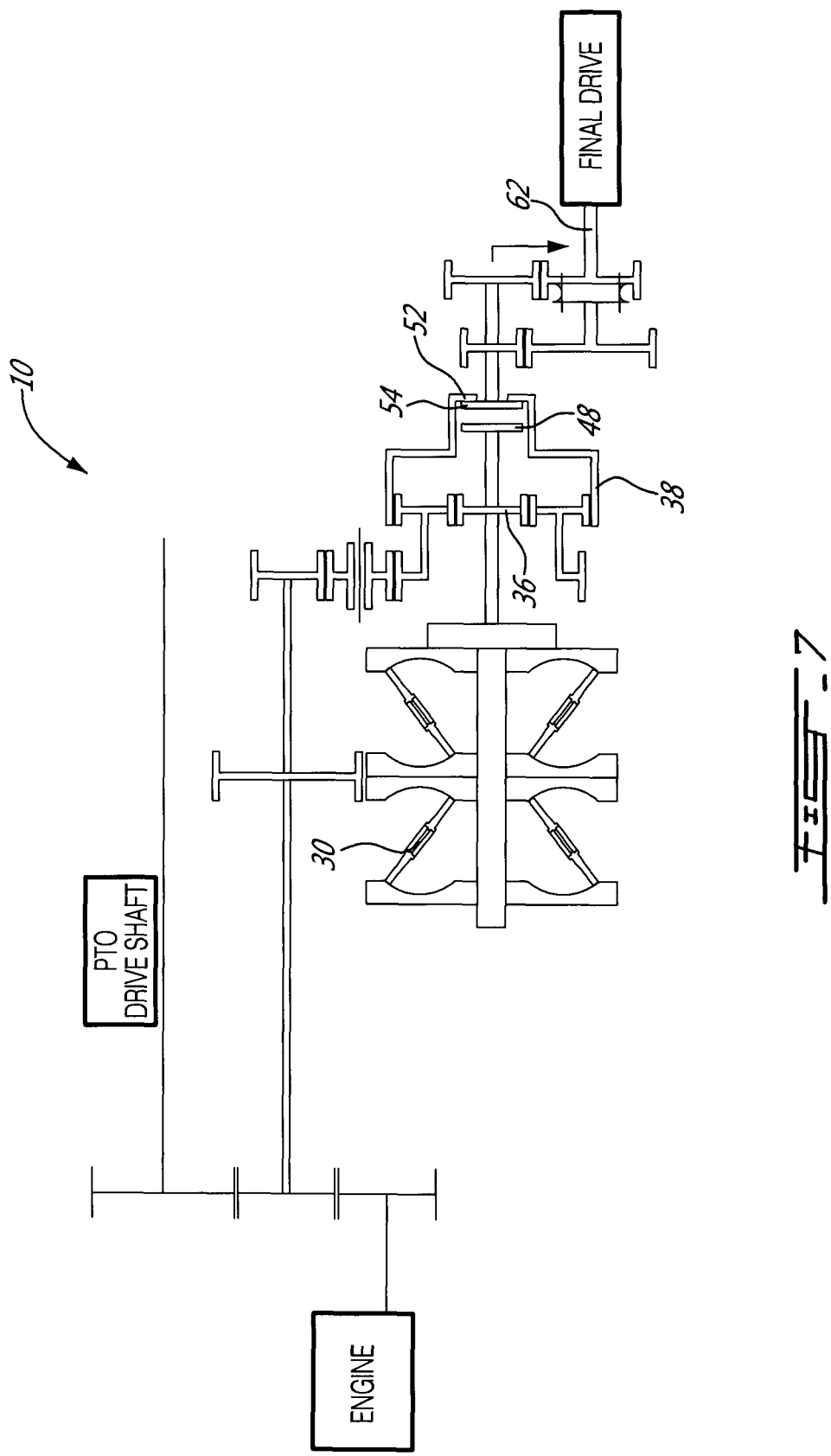
FIG. 7 is a schematic bloc diagram of the drive train of FIG. 1 shown at the maximal speed of the IVT high configuration.

Turning now to FIG. 7 which is a schematic bloc diagram of the drive train 10 shown at the maximal speed of the IVT high configuration since the rollers 30 are in their underdrive position. Again, thanks to the various predetermined gear ratios of the drive train 10, the speed of the sun gear 36 and the speed of the ring gear 38 are very similar, allowing the movable disk 54 of the clutch 46 to be moved, without surge to the operator, so that it engages the fixed disk 48 to thereby place the drive train 10 in the CVT high configuration shown in FIG. 8.

Figure 8:
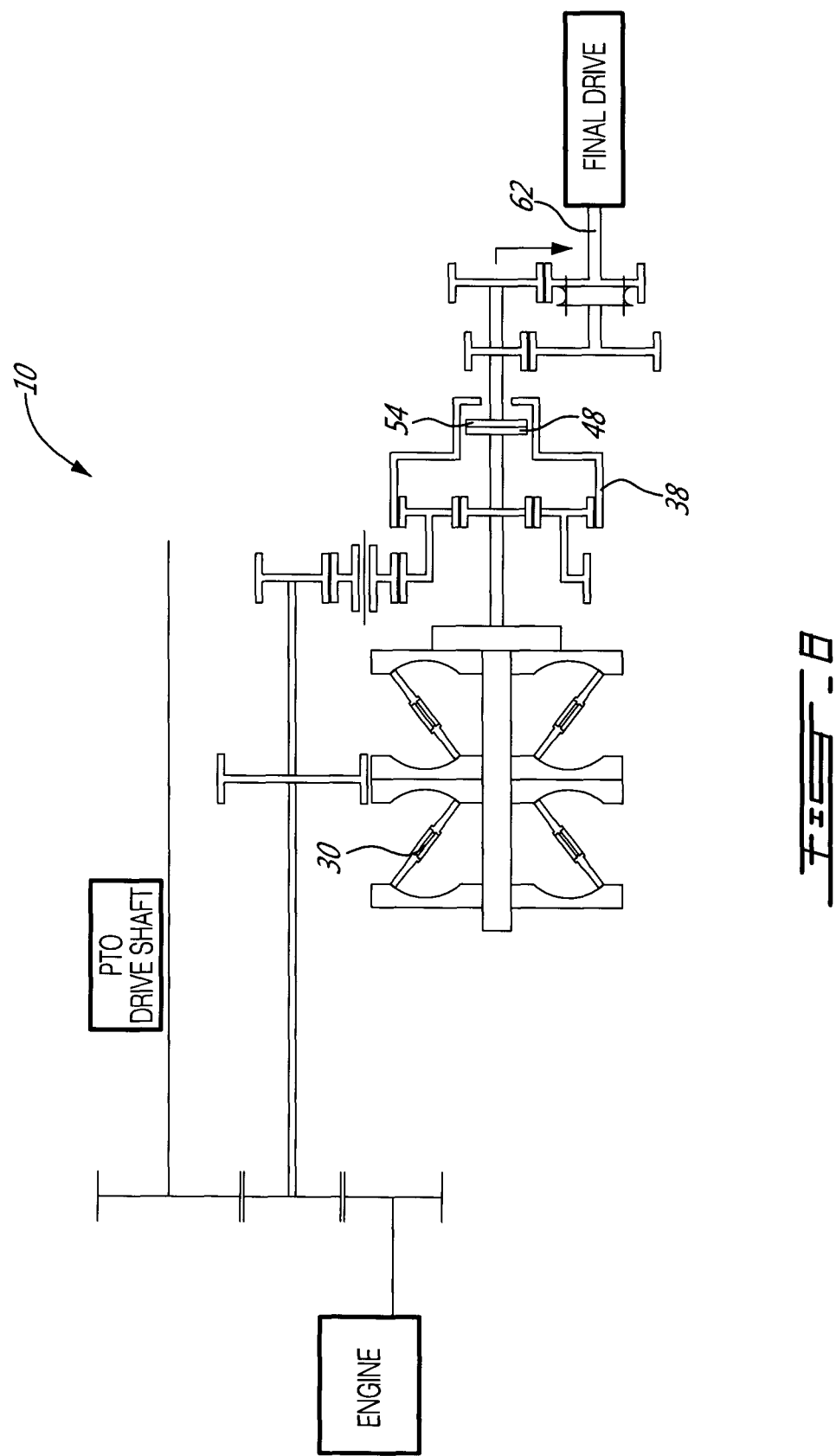
FIG. 8 is a schematic bloc diagram of the drive train of FIG. 1 shown in a CVT high configuration.

As can be seen from FIG. 8, the movable disk 54 is connected to the first fixed disk 48 to place the drive train into the CVT high configuration.

Figure 9:
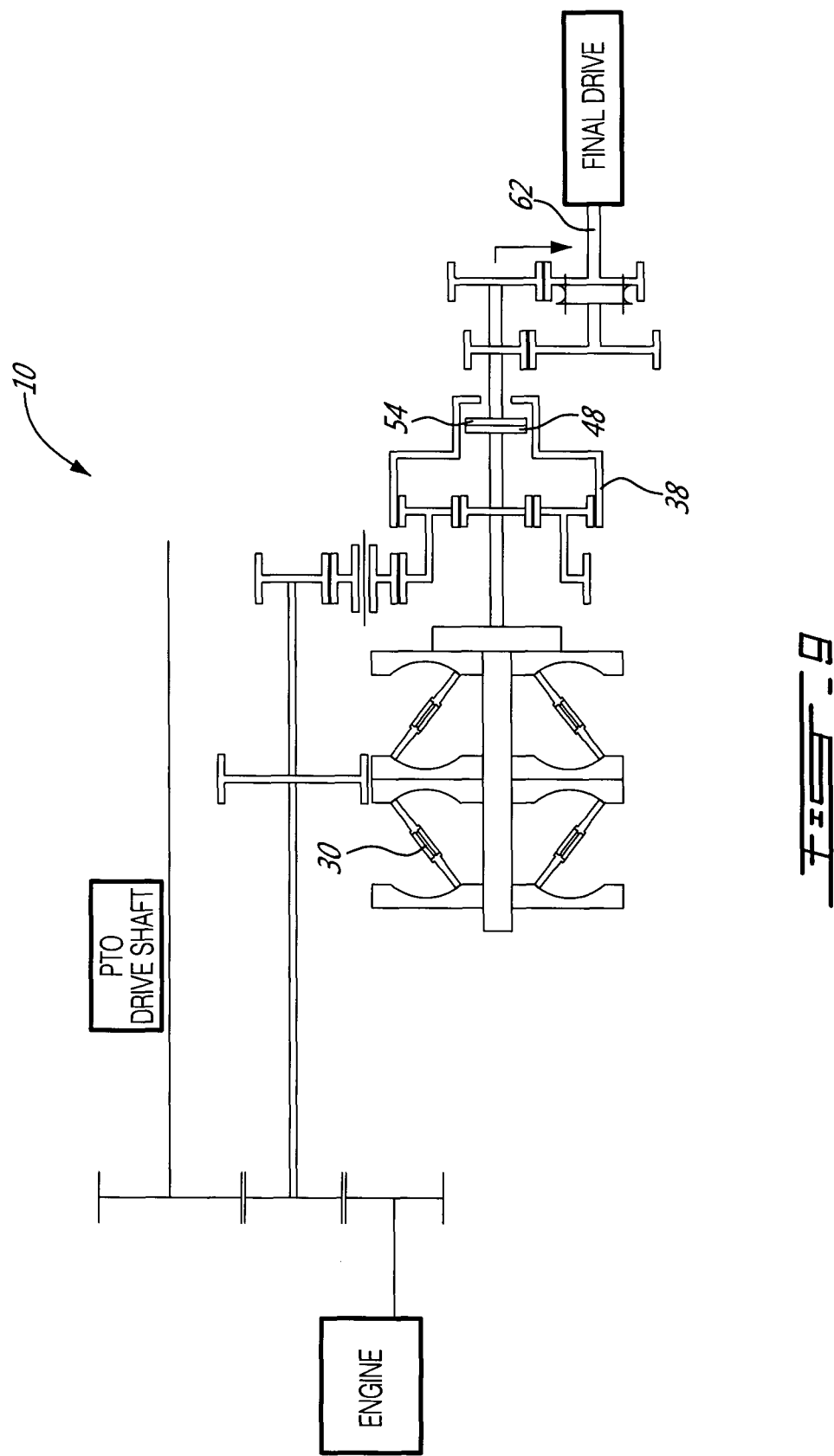
FIG. 9 is a schematic bloc diagram of the drive train of FIG. 1 shown at the maximal speed of the CVT high configuration.

To increase the speed of the output shaft 62, the rollers 30 of the CVT 22 are moved from their underdrive position illustrated in FIG. 8 to their overdrive position illustrated in FIG. 9.

It is also to be noted that while a clutch 46 is described above to connect either the sun gear or the ring gear of the power mixing mechanism to the High-Low gear selection assembly, one skilled in the art would be in a position to design other clutching arrangements to interconnect these elements with the same functionality.

Turning now to FIGS. 10 to 18 of the appended drawings, a drive train 100 according to a second illustrative embodiment will be described. Since the drive train 100 is very similar to the drive train 10 described hereinabove and illustrated in FIGS. 1 to 9, only the differences therebetween will be described hereinbelow for concision purpose.

Generally stated, the differences between the drive trains 10 and 100 are related to the High-Low gear selection assembly and to the lack of a three-position clutch in the drive train 100. The elements of the drive train 100 upstream from and including the power mixing mechanism 34 are identical and identically numbered.

The drive train 100 includes first and second concentric shafts 102 and 104 respectively connected to the output of the CVT 22, via the sun 36, and to the output of the power mixing mechanism 34, i.e. to the ring 38.

Both shafts 102 and 104 define the input of the High-Low gear selection assembly 106 that has an output shaft 108 connected to the final drive 64.

The High-Low gear selection assembly 106 includes a first low gear set 110 selectively interconnecting the shaft 104 to the output shaft 108; a first high gear set 112 selectively interconnecting the shaft 104 to the output shaft 108; a second low gear set 114 selectively interconnecting the shaft 102 to the output shaft 108; and a second high gear set 116 selectively interconnecting the shaft 102 to the output shaft 108.

The High-Low gear selection assembly 106 further includes a first gear set selecting mechanism in the form of a three-position synchronizer 118 selectively interconnecting either the first low gear set 110 or the first high gear set 112 to the shaft 104 and a second gear set selecting mechanism in the form of a three-position synchronizer 120 selectively interconnecting either the second low gear set 114 or the second high gear set 116 to the shaft 102.

Figure 10:
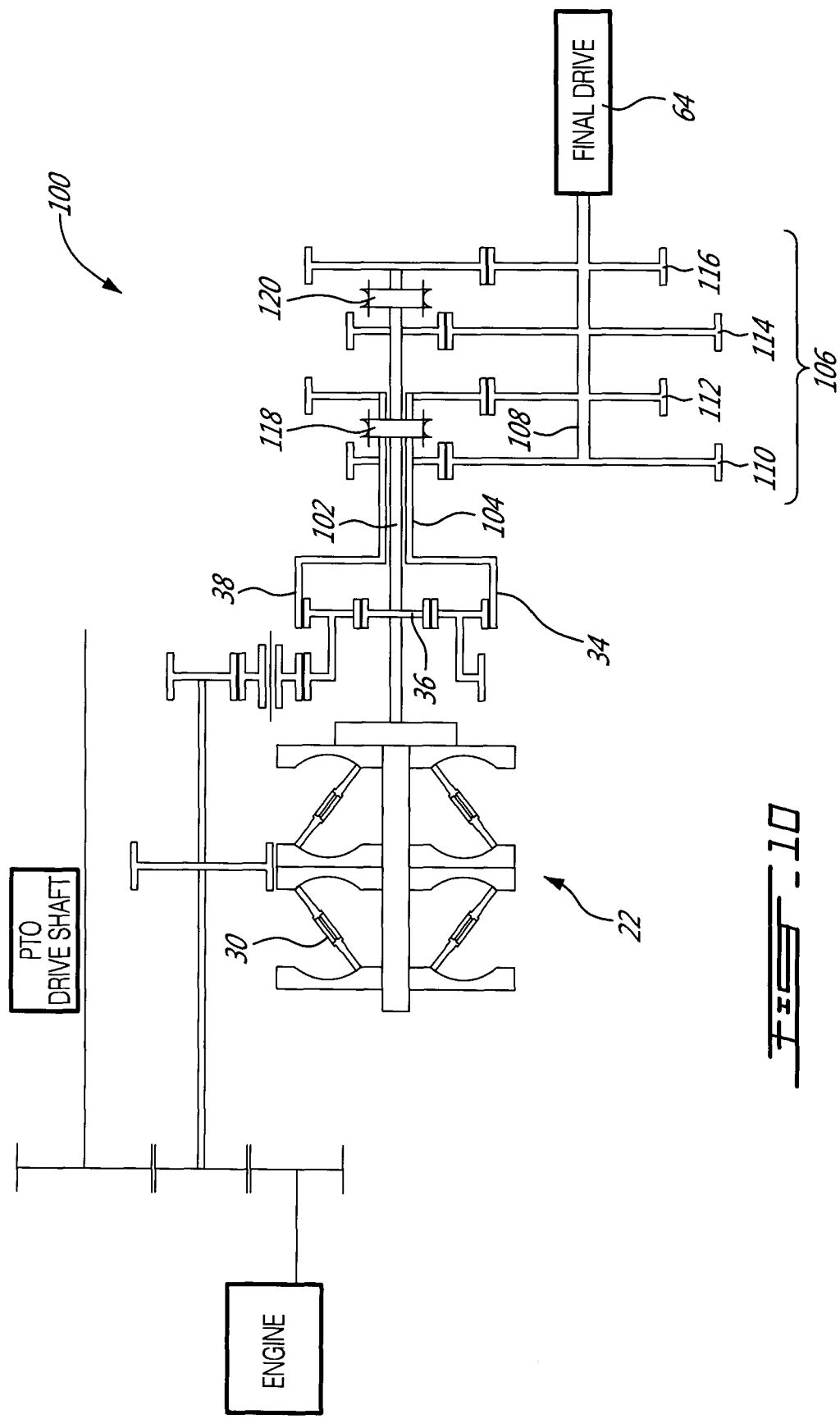
FIG. 10 is a schematic bloc diagram of a drive train including a CVT according to a second illustrative embodiment.

It is to be noted that the first and second synchronizers 118 and 120 are illustrated in their free wheeling position in FIG. 10. In other words, when the synchronizers are in this position, no gear set is engaged and no torque is transferred to the output shaft 108.

Turning now to FIGS. 11 to 18 of the appended drawings, the operation of the drive train 100 will be described.

Figure 11:
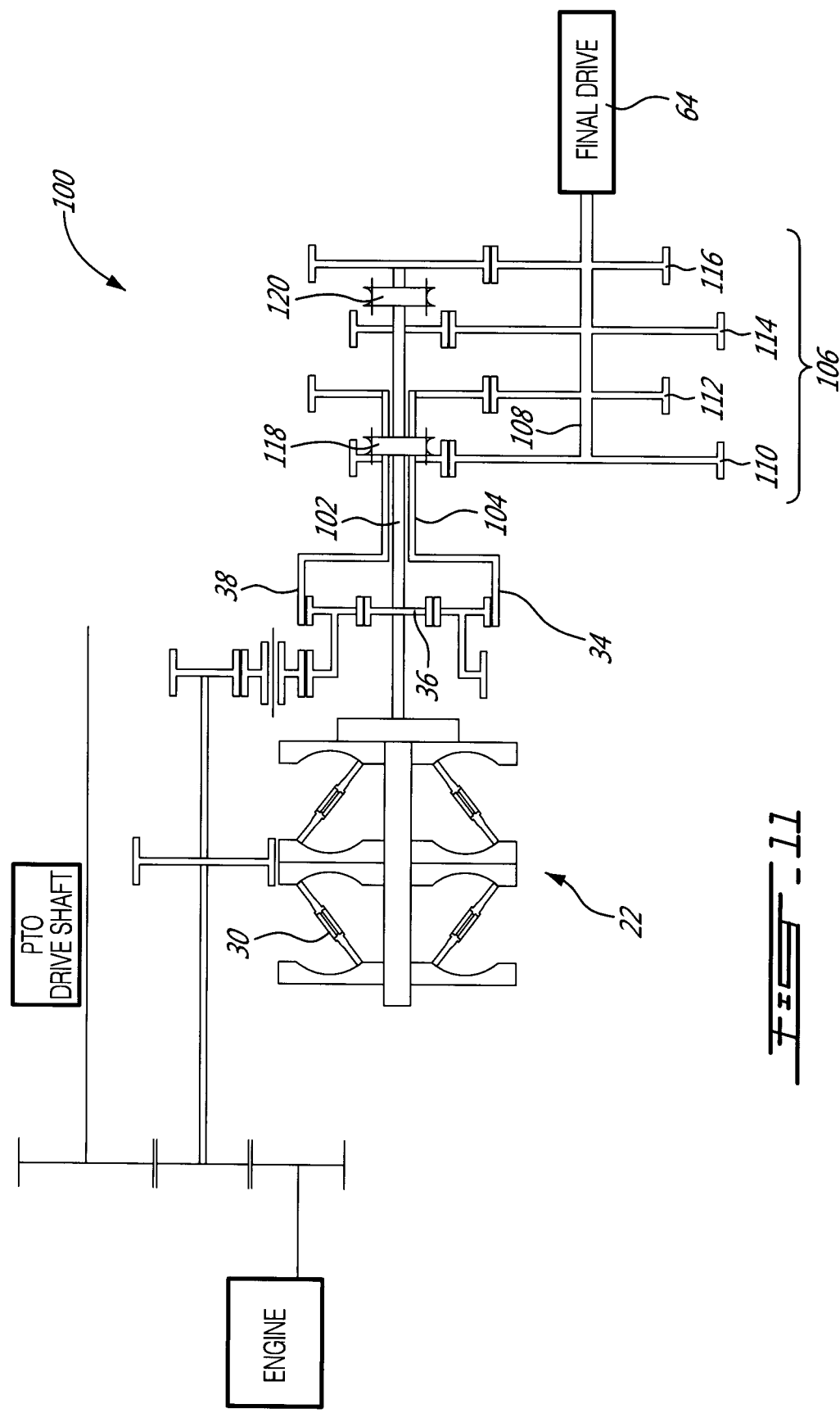
FIG. 11 is a schematic bloc diagram of the drive train of FIG. 10 shown in an IVT low configuration.

In FIG. 11, the synchronizer 118 is so positioned as to interconnect the first low gear set 110 to the shaft 104, placing the drive train 100 in the IVT-low configuration. It is to be noted that the synchronizer 120 remains in the freewheeling position.

The ratios of the various gears of the drive train 100 are so selected that when the drive train 100 is in the IVT-low configuration shown in FIG. 11, and when the rollers 30 of the CVT 22 are in the overdrive position, the speed of the sun gear 36 and the speed of the planet carrier 40 are cancelling each other thus resulting in a zero speed of the ring gear 38. Accordingly, the speed of the output shaft 108 is also zero.

Again, as mentioned hereinabove, one skilled in the art will understand that by appropriately selecting the various gear ratios of the drive train 10, configuration of FIG. 2 could result in a reverse direction rotation of the output shaft 62.

Figure 12:
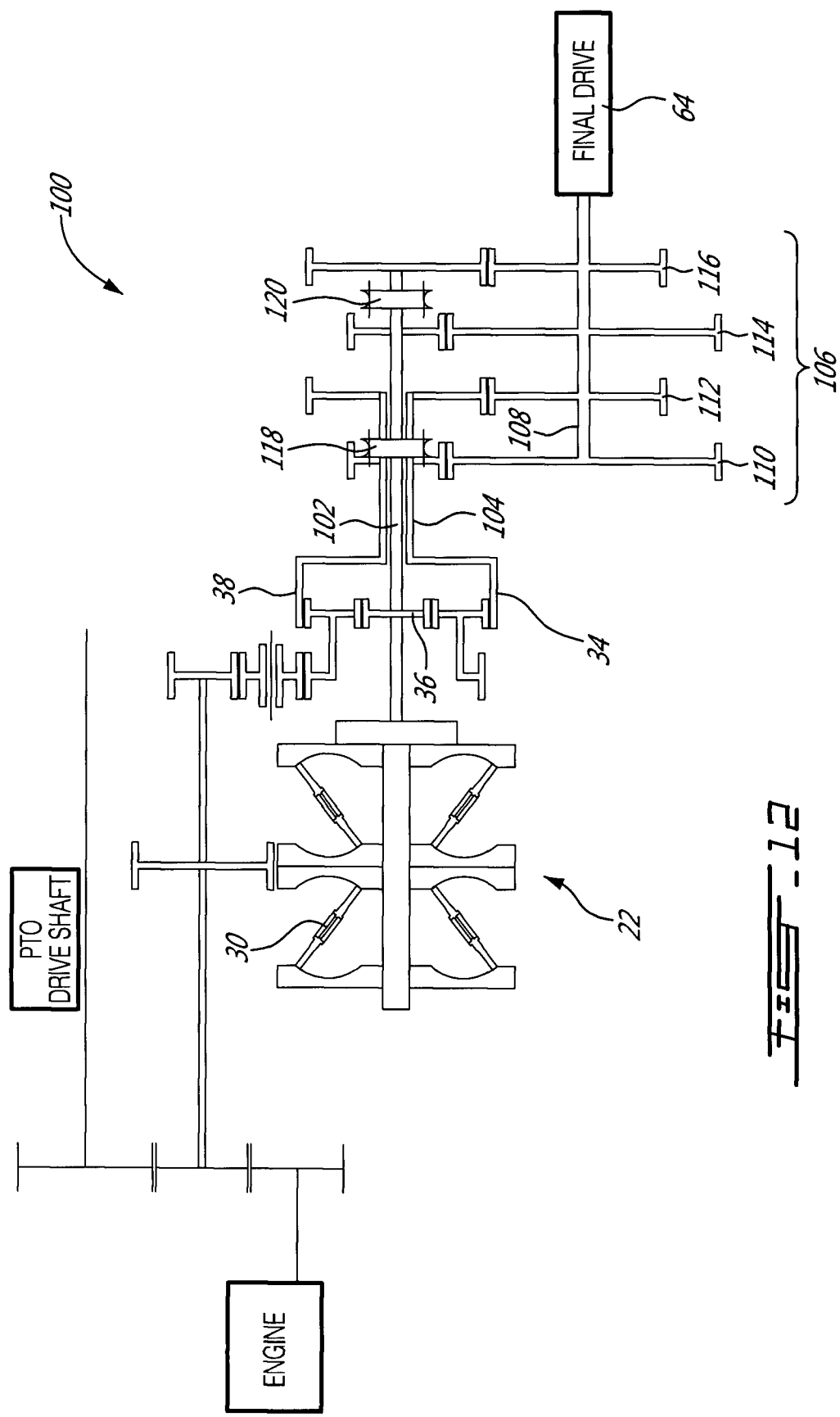
FIG. 12 is a schematic bloc diagram of the drive train of FIG. 10 shown at the maximal speed of the IVT low configuration.

Turning to FIG. 12, when the rollers 30 are moved from the overdrive position shown in FIG. 11 to the underdrive position shown in FIG. 12, the speed of the sun gear 36 decreases while the speed of the planet carrier 40 stays the same since the main shaft 18 speed is kept constant by the engine 12. Accordingly, the speed of the ring gear 38 increases to the IVT low maximal speed when the rollers 30 reach the underdrive position illustrated in FIG. 12.

It is to be noted that when the drive train 100 is in the configuration shown in FIG. 12, the speed of the ring gear 38 and the speed of the sun gear 36 are very similar, thanks to the various predetermined ratios of gears of the drive train 10. Since these speeds are very similar, it is possible to switch from the IVT-low configuration of FIG. 12 to the CVT-low configuration of FIG. 13.

This is done by switching the synchronizer 118 from its position where it engages the first low gear set 110 to its freewheeling position, and by switching the synchronizer 120 from its freewheeling position to the position where it engages the second low gear set 114. This CVT-low configuration is shown in FIG. 13.

Figure 13:
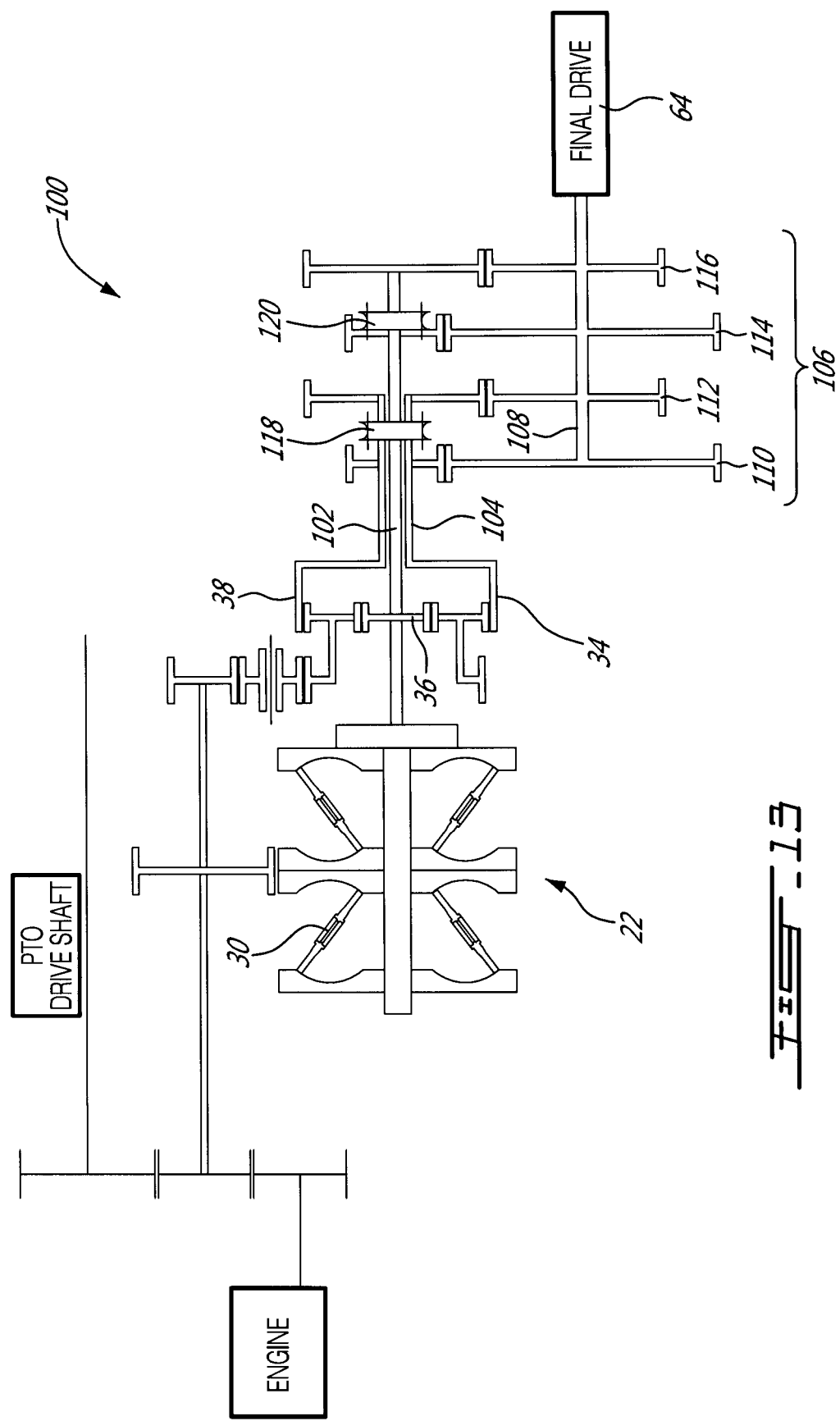
FIG. 13 is a schematic bloc diagram of the drive train of FIG. 1 shown in a CVT low configuration.
Figure 14:
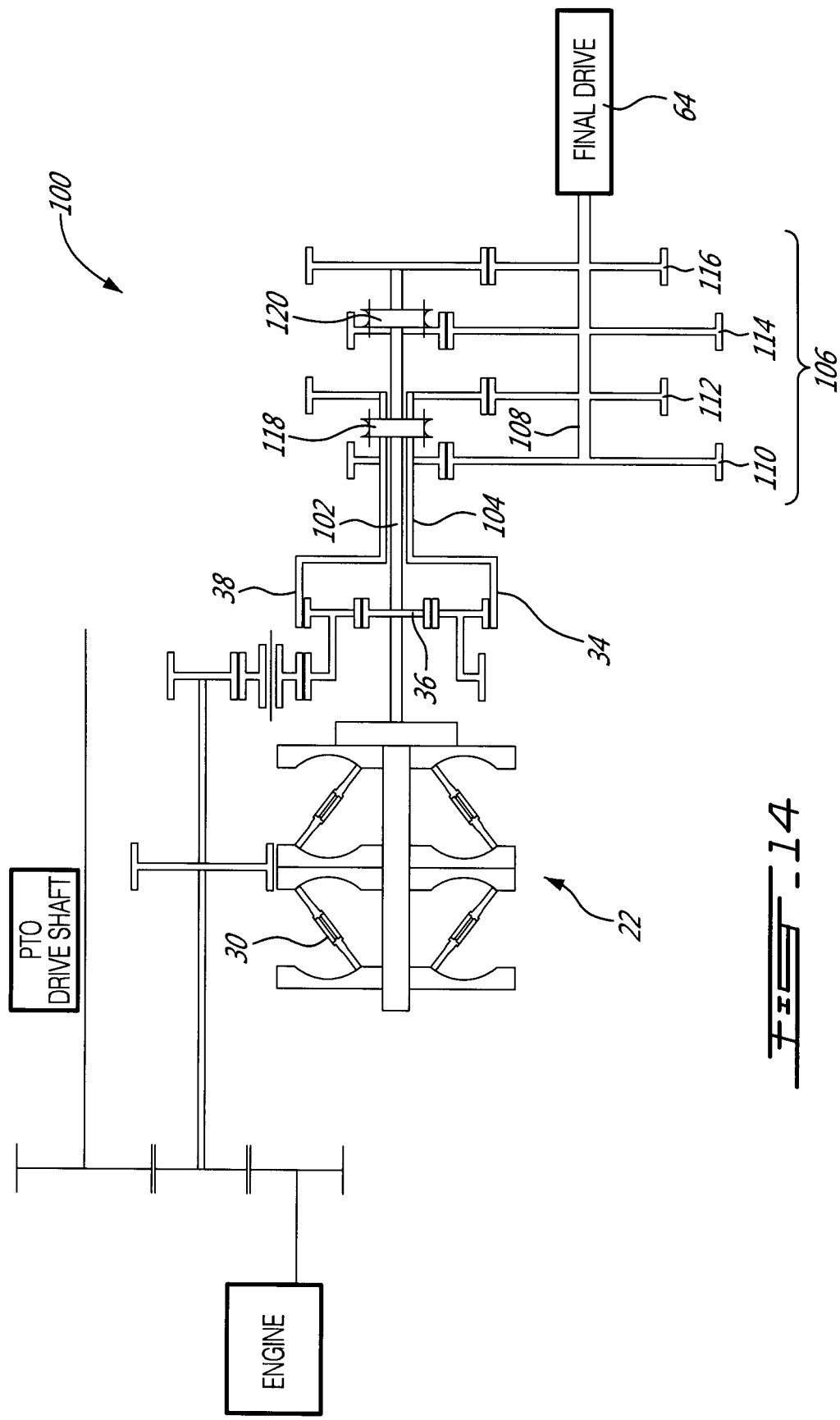
FIG. 14 is a schematic bloc diagram of the drive train of FIG. 10 shown at the maximal speed of the CVT low configuration.

When an increase of the speed of the output shaft 108 is desired, the rollers 30 of the CVT 22 move from the underdrive configuration of FIG. 13 to the overdrive configuration of FIG. 14.

FIG. 14 is a schematic bloc diagram of the drive train 100 shown at the maximal speed of the CVT-low configuration. The rollers position schematically shown in FIG. 14 is such that the speed of the sun gear 36 and of the ring gear 38 are once again very similar allowing the configuration of the drive train 100 to be moved from the CVT-low configuration to the IVT-high configuration.

Figure 15:
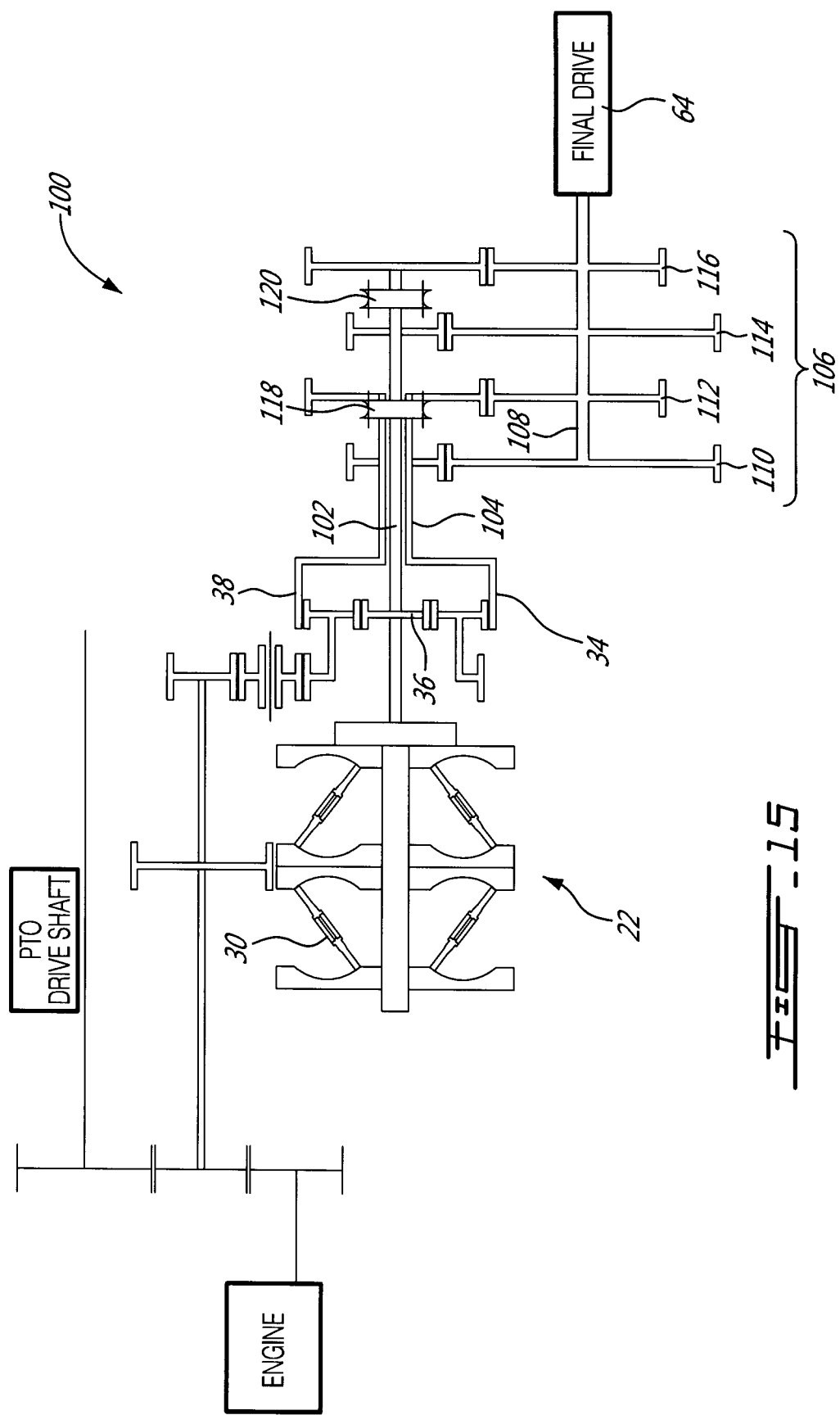
FIG. 15 is a schematic bloc diagram of the drive train of FIG. 10 shown in an IVT high configuration.

This is done by switching the synchronizer 120 from its position where it engages the second low gear set 114 to its freewheeling position, and by switching the synchronizer 118 from its freewheeling position to the position where it engages the first high gear set 112. This IVT-high configuration is shown in FIG. 15.

When the drive train 100 is in this configuration, the rollers 30 can be moved towards their underdrive configuration to increase the speed of the output shaft 62.

Figure 16:
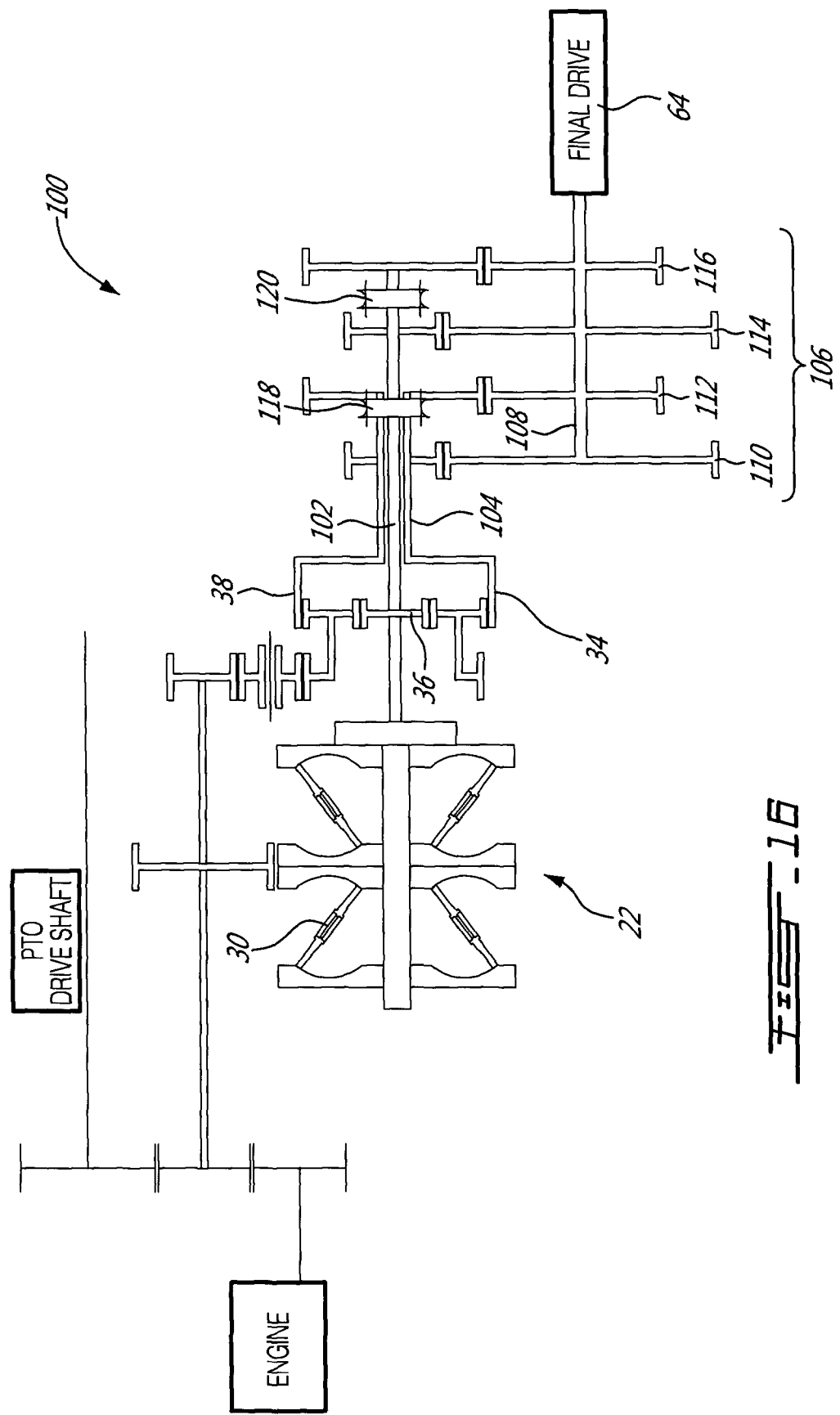
FIG. 16 is a schematic bloc diagram of the drive train of FIG. 10 shown at the maximal speed of the IVT high configuration.

Turning now to FIG. 16 which is a schematic bloc diagram of the drive train 100 shown at the maximal speed of the IVT-high configuration since the rollers 30 are in their underdrive position. Again, thanks to the various predetermined gear ratios of the drive train 100, the speed of the sun gear 36 and the speed of the ring gear 38 are very similar, allowing the drive train 100 to be switched from the IVT-high to the CVT-high configuration.

This is done by switching the synchronizer 118 from its position where it engages the first high gear set 112 to its freewheeling position, and by switching the synchronizer 120 from its freewheeling position to the position where it engages the second high gear set 116. This CVT-high configuration is shown in FIG. 17.

Figure 17:
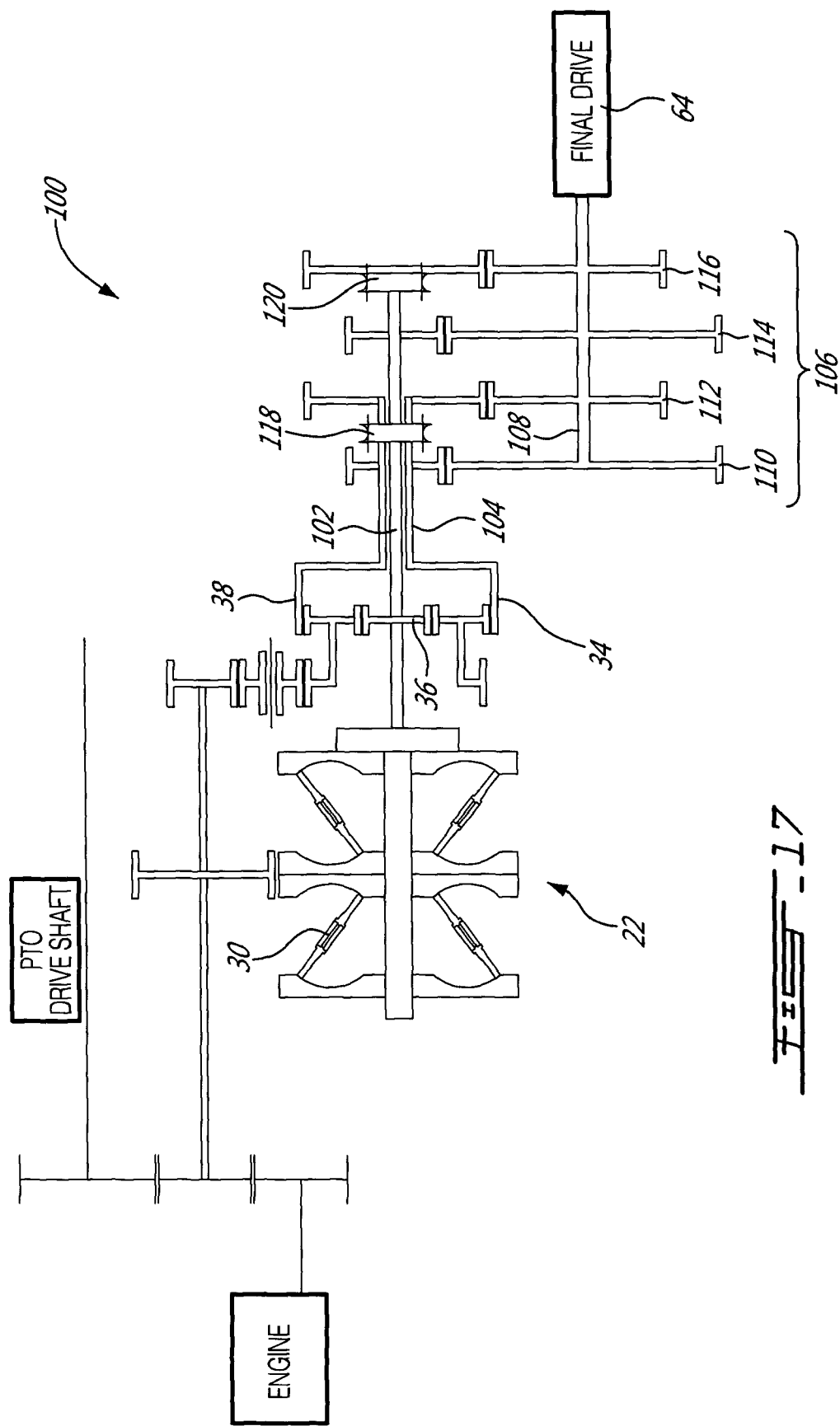
FIG. 17 is a schematic bloc diagram of the drive train of FIG. 10 shown in a CVT high configuration.
Figure 18:
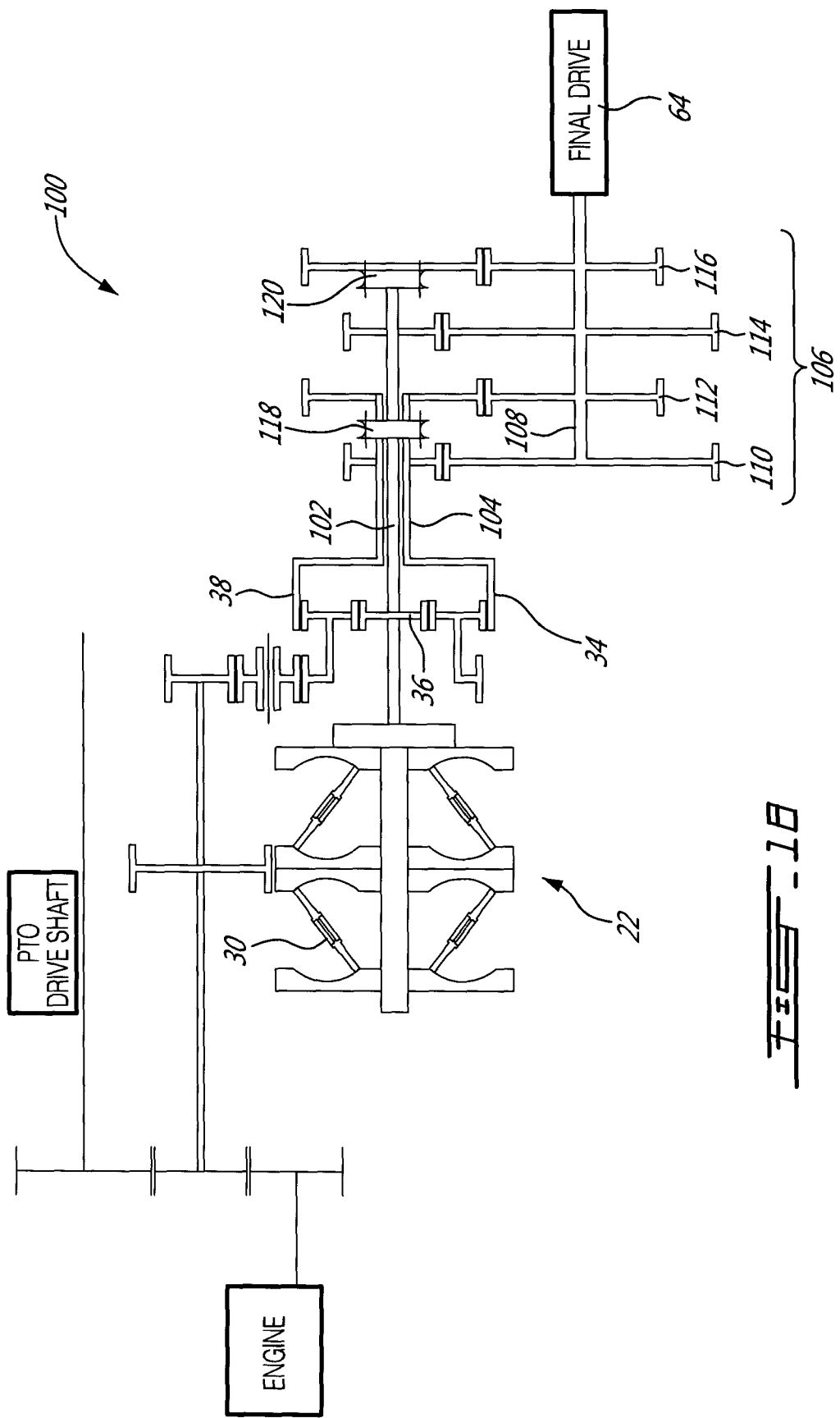
FIG. 18 is a schematic bloc diagram of the drive train of FIG. 10 shown at the maximal speed of the CVT high configuration.

To increase the speed of the output shaft 108, the rollers 30 of the CVT 22 are moved from their underdrive position illustrated in FIG. 17 to their overdrive position illustrated in FIG. 18.

One skilled in the art will understand that the synchronizers 118 and 120 could be replaced by other gear set selecting mechanisms such as, for example, three-position clutches.

One skilled in the art will understand that the configuration of the drive train 100 makes it easier to achieve the transitions between IVT and CVT configurations without surges to the operator.

It is to be noted that wile the prime mover has been described herein as an engine 12, other prime movers, such as for example turbines and electric motors, could be used.

One skilled in the art will understand that the entire range of speed of the drive train has been spanned without changing the speed of the engine 12 and without noticeable surges to the operator.

One skilled in the art is believed to be in a position to design or to select appropriate parts of the drive train depending on the required maximal speed and torque required for a specific application.

Optionally, a forward/reverse gear assembly (not shown) could be provided, for example between the power mixing assembly and the high-low gear selection assembly.

One skilled in the art will understand that while a double cavity toroidal CVT has been illustrated herein, other CVT technologies could be used.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. A drive train including:
    a prime mover having an output shaft;
    a CVT including an input flange associated to the output shaft of the prime mover and an output flange;
    a power mixing assembly including: a planetary gear train provided with a planet carrier defining a first input connected to the output shaft of the prime mover; a sun gear defining a second input connected to the output flange of the CVT, a ring gear defining an output of the power mixing assembly and planet gears; and
    a high-low gear selection assembly having an input and an output defining the output of the drive train; the input of the high-low gear selection assembly being connectable to either the output flange of the CVT or to the output of the power mixing assembly.

2. A drive train as recited in claim 1, wherein the prime mover includes an engine.

3. A drive train as recited in claim 1, wherein the CVT is a dual cavity toroidal CVT.

4. A drive train as recited in claim 1, wherein the power mixing assembly further includes a direction reversing gear set provided between the output shaft of the prime mover and the planet carrier of the planetary gear train.

5. A drive train as recited in claim 1, wherein the high-low gear selection assembly includes a clutch assembly provided with a first fixed disk associated with the second input of the power mixing assembly; a second fixed disk associated with the output of the power mixing assembly and a movable disk associated with the input of the high-low gear selection assembly; wherein the movable disk is movable between a first position where the movable disk is in contact with the first fixed disk and a second position where the movable disk is in contact with the second fixed disk; whereby the input of the high-low gear selection assembly is connectable to either the output flange of the CVT or to the output of the power mixing assembly.

6. A drive train as recited in claim 1, wherein the high-low gear selection assembly includes a low gear set selectively interconnecting the input of the high-low gear selection assembly to the output of the high-low gear selection assembly via a gear arrangement having a first ratio; a high gear set selectively interconnecting the input of the high-low gear selection assembly to the output of the high-low gear selection assembly via a gear arrangement having a second ratio; and a gear set selecting mechanism selectively activating one of the low gear set and the high gear set; the first ratio being higher than the second ratio.

7. A drive train as recited in claim 6, wherein the gear set engagement mechanism is selected from the group consisting of a dual acting clutch pack and a synchronizer.

8. A drive train as recited in claim 1, wherein:
    the input of the high-low gear selection assembly includes first and second shafts; the first shaft being associated with the second input of the power mixing assembly and the second shaft being associated with the output of the power mixing assembly;
    the high-low gear selection assembly includes a first low gear set selectively interconnecting the first shaft of the high-low gear selection assembly to the output of the high-low gear selection assembly via a gear arrangement having a first ratio; a first high gear set selectively interconnecting the first shaft of the high-low gear selection assembly to the output of the high-low gear selection assembly via a gear arrangement having a second ratio; and a first gear set selecting mechanism selectively activating one of the first low gear set and the first high gear set; the first ratio being higher than the second ratio;
    the high-low gear selection assembly includes a second low gear set selectively interconnecting the second shaft of the high-low gear selection assembly to the output of the high-low gear selection assembly via a gear arrangement having a third ratio; a second high gear set selectively interconnecting the second shaft of the high-low gear selection assembly to the output of the high-low gear selection assembly via a gear arrangement having a fourth ratio; and a second gear set selecting mechanism selectively activating one of the second low gear set and the second high gear set; the third ratio being higher than the fourth ratio.

9. A drive train as recited in claim 8, wherein the first and second shafts are concentric.

10. A drive train as recited in claim 8, wherein the first and second gear set selecting mechanisms each include a three position synchronizer.

11. A drive train for a vehicle including a prime mover provided with an output shaft; the drive train comprising:
    a CVT including an input flange connected to the output shaft of the prime mover and an output flange;
    a power mixing assembly including: a planetary gear train provided with a planet carrier defining a first input connected to the output shaft of the prime mover; a sun gear defining a second input connected to the output flange of the CVT, a ring gear defining an output of the power mixing assembly and planet gears; and
    a high-low gear selection assembly having an input and an output defining the output of the drive train; the input of the high-low gear selection assembly being connectable to either the output flange of the CVT or the output of the power mixing assembly.

12. A drive train, comprising:

a prime mover having an output shaft;

a CVT including an input flange cooperating with the output shaft of the prime mover and an output flange;

a power mixing assembly having a first input connected to the output shaft of the prime mover, a second input connected to the output flange of the CVT, and an output; and a high-low gear selection assembly having an input and an output defining the output of the drive train, the input of the high-low gear selection assembly being connectable to either the output flange of the CVT or to the output of the power mixing assembly;

wherein the high-low gear selection assembly includes a clutch assembly provided with a first fixed disk associated with the second input of the power mixing assembly, a second fixed disk associated with the output of the power mixing assembly and a movable disk associated with the input of the high-low gear selection assembly; and wherein the movable disk is movable between a first position where the movable disk is in contact with the first fixed disk and a second position where the movable disk is in contact with the second fixed disk, whereby the input of the high-low gear selection assembly is connectable to either the output flange of the CVT or to the output of the power mixing assembly.

13. A drive train as recited in claim 12, wherein the high-low gear selection assembly comprises:

a low gear set selectively interconnecting the input of the high-low gear selection assembly to the output of the high-low gear selection assembly via a gear arrangement having a first ratio;

a high gear set selectively interconnecting the input of the high-low gear selection assembly to the output of the high-low gear selection assembly via a gear arrangement having a second ratio; and a gear set selecting mechanism selectively activating one of the low gear set and the high gear set; the first ratio being higher than the second ratio.

14. A drive train as recited in claim 13, wherein the gear set engagement mechanism comprises one of a dual acting clutch pack or a synchronizer.

\* \* \* \* \*